(12) United States Patent
Shlomov

(10) Patent No.: US 10,292,483 B2
(45) Date of Patent: May 21, 2019

(54) EYEBROW SHAPING METHOD

(71) Applicant: Nisan Shlomov, Jerusalem (IL)

(72) Inventor: Nisan Shlomov, Jerusalem (IL)

(*) Notice: Subject to any disclaimer, the term of this patent is extended or adjusted under 35 U.S.C. 154(b) by 0 days.

(21) Appl. No.: 15/464,389

(22) Filed: Mar. 21, 2017

(65) Prior Publication Data
US 2018/0271257 A1 Sep. 27, 2018

(51) Int. Cl.
G06K 9/00 (2006.01)
A45D 44/00 (2006.01)
G06K 9/62 (2006.01)
G06T 5/00 (2006.01)
A45D 40/26 (2006.01)
A45D 26/00 (2006.01)

(52) U.S. Cl.
CPC ....... A45D 44/005 (2013.01); A45D 26/0076 (2013.01); A45D 40/262 (2013.01); G06K 9/6215 (2013.01); G06T 5/005 (2013.01); A45D 2044/007 (2013.01); G06T 2207/30201 (2013.01)

(58) Field of Classification Search
None
See application file for complete search history.

(56) References Cited

U.S. PATENT DOCUMENTS

2015/0262403 A1* 9/2015 Yamanashi ............ G06T 11/60
345/634

* cited by examiner

Primary Examiner — Stephen P Coleman
(74) Attorney, Agent, or Firm — Alphapatent Associates, Ltd; Daniel J. Swirsky

(57) ABSTRACT

An eyebrow shaping apparatus, including: a camera, for capturing one image of each of two eyebrows of a user at an initial state; an image processor, for horizontally flipping one of the two images, and for searching for differences between the horizontally flipped image and the other image, and for suggesting corrections in at least one of the captured images for obtaining a requested state having two equal mirrored images; CNC (Computer Numerical Control), for producing a program including physical steps for modifying the eyebrows from the initial state to the requested state; and a painting tip, a hair removing tip, and a robotic arm, for executing the program.

3 Claims, 4 Drawing Sheets

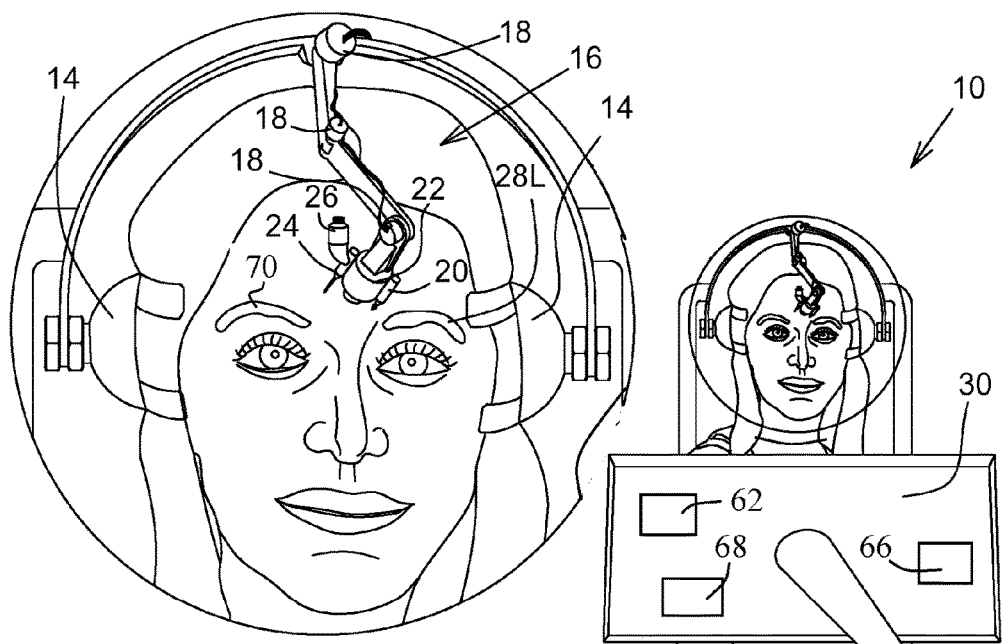
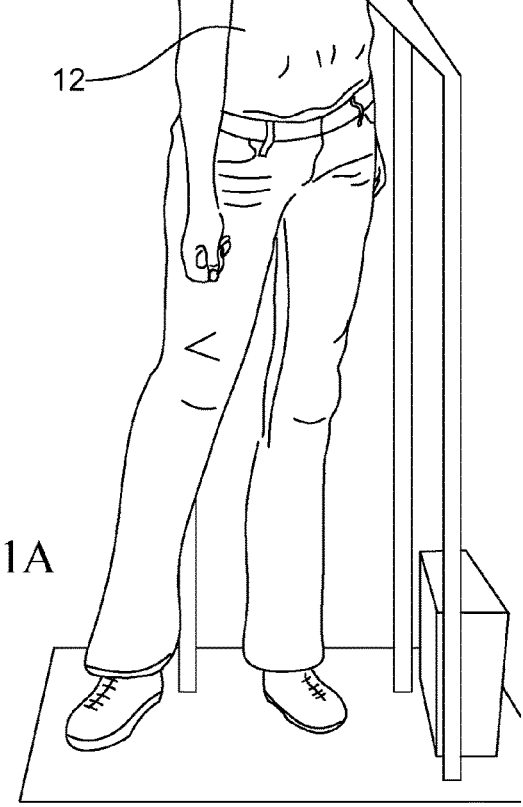
FIG 1B
FIG 1A

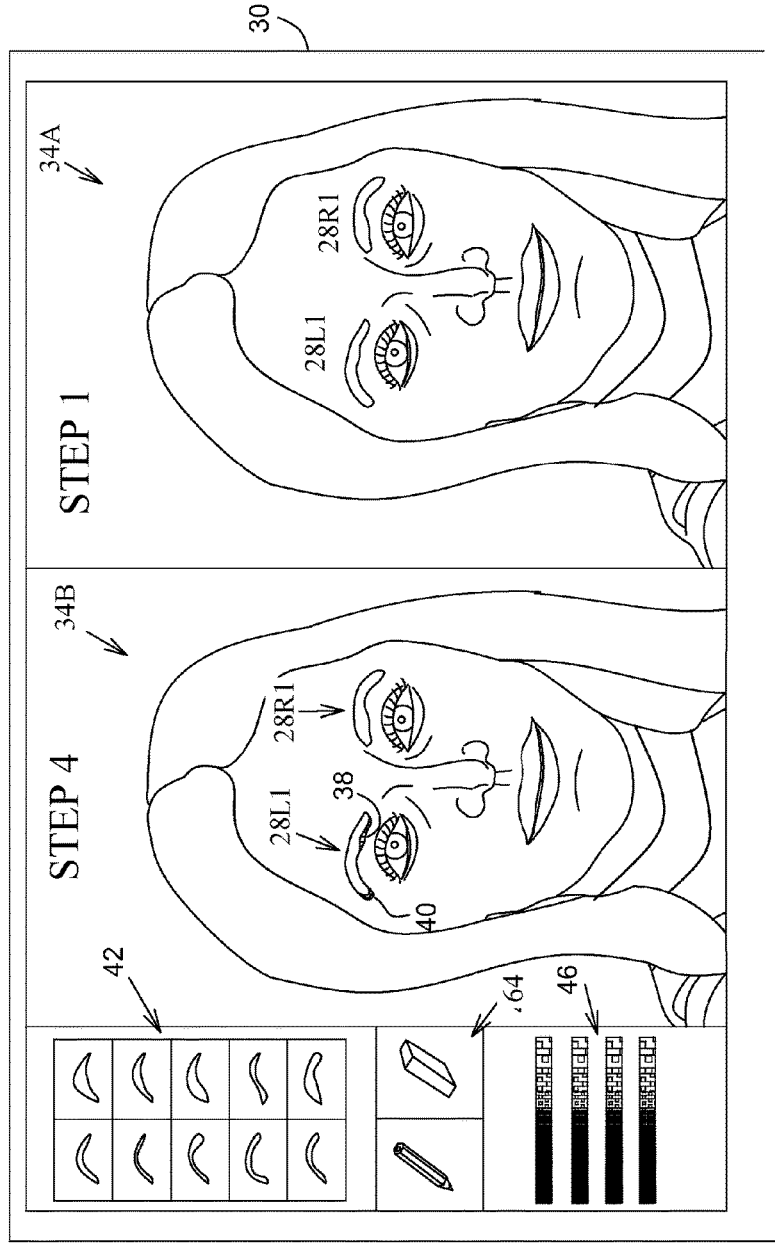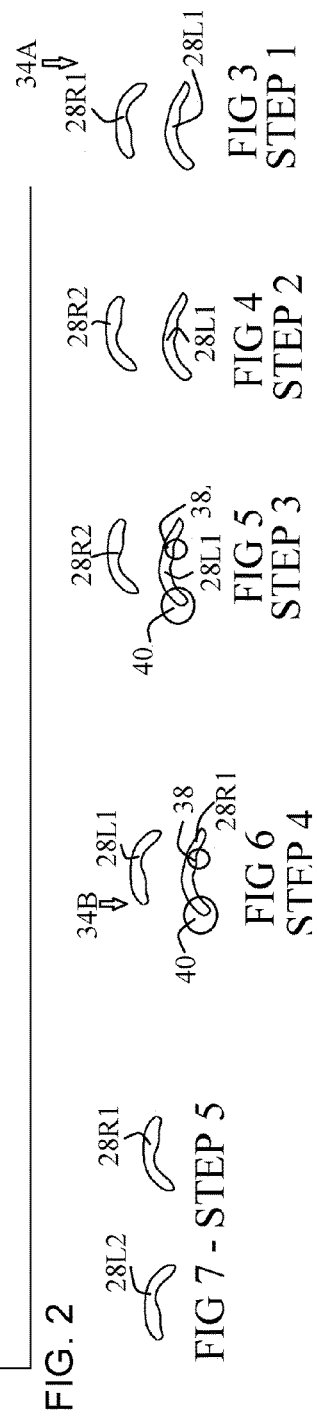

STEP 8

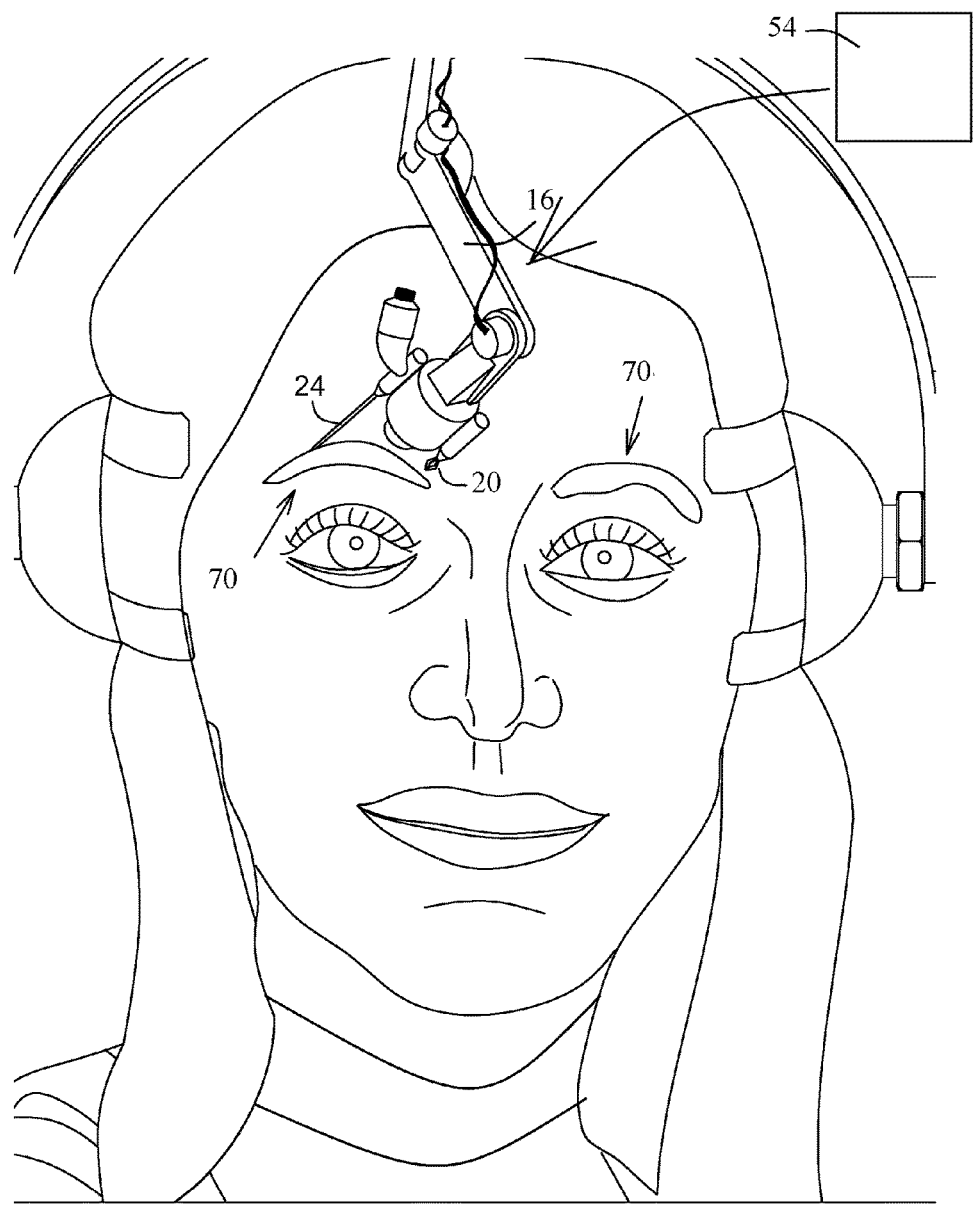
FIG 10 - STEP 9

EYEBROW SHAPING METHOD

TECHNICAL FIELD

The invention relates to the field of cosmetics. More particularly, the invention relates to an apparatus for shaping eyebrows.

BACKGROUND

Eyebrows shaping is different from other fields of cosmetics in the requirement of ensuring that the two eyebrows must be very symmetrical.

There is a long felt need to provide a solution to eyebrows shaping regarding the symmetrical requirement.

BRIEF DESCRIPTION OF THE DRAWINGS

Embodiments, features, and aspects of the invention are described herein in conjunction with the following drawings:

FIG. 1A depicts an eyebrow shaping apparatus according to one embodiment of the invention.

FIG. 1B is a magnification of the top region of FIG. 1A.

FIG. 2 depicts the first and fourth steps of eyebrow shaping, using the eyebrow shaping apparatus of FIG. 1A.

FIG. 3 depicts the right and left views of FIG. 2, placed for comparing one to the other.

FIG. 4 depicts the second step of the eyebrow shaping.

FIG. 5 depicts the third step of the eyebrow shaping.

FIG. 6 depicts the fourth step of the eyebrow shaping.

FIG. 7 depicts the fifth step of the eyebrow shaping.

FIG. 10 depicts the ninth step.

Figure 9:
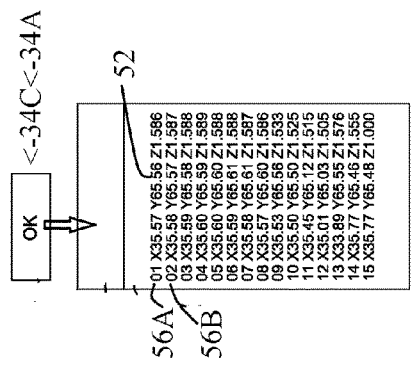
FIG. 9 depicts the eighth step.

The drawings are not necessarily drawn to scale.

DETAILED DESCRIPTION

The invention will be understood from the following detailed description of embodiments of the invention, which are meant to be descriptive and not limiting. For the sake of brevity, some well-known features are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with apparatus and methods thereof, which are meant to be merely illustrative, and not limiting.

FIG. 1A depicts an eyebrow shaping apparatus according to one embodiment of the invention.

FIG. 1B is a magnification of the top region of FIG. 1A.

An eyebrow shaping apparatus 10, according to one embodiment of the invention, includes a camera 22; a display 30 for allowing the user 12 to view the captures of camera 22; an image processor 62; a painting tip 24, for paining the user's eyebrows; a hair removing tip 20, for removing hair from the eyebrows; and a robotic arm 16, for moving camera 22, painting tip 24, and hair removing tip 20.

FIG. 2 depicts the first and fourth steps of eyebrow shaping, using the eyebrow shaping apparatus of FIG. 1A.

At the first step, camera 22 (of FIG. 1B) captures the initial state 34A of the user, including of the eyebrows. In this state the image of the right eyebrow is enumerated 28R1, and the image of the left eyebrow is enumerated 28L1.

FIG. 3 depicts the right and left views of FIG. 2, placed for comparing one to the other.

FIG. 4 depicts the second step of the eyebrow shaping.

At the second step, image processor 62 of FIG. 1A horizontally flips either image 28R1 or 28L1. According to the example, right eyebrow image 28R1 is flipped horizontally, providing an image 28R2.

FIG. 5 depicts the third step of the eyebrow shaping.

At the third step, image processor 62 of FIG. 1A compares image 28R2 of the right eyebrow to image 28L1 of the left eyebrow, and searches for differences.

According to the example, image processor 62 finds that image 28L1 (of the left eyebrow) has an absent region 38 in relation to image 28R2, and has a surplus region 40 in relation to image 28R2.

The analysis that region 38 is an absent region in image 28L1 may be changed to another analysis, being also correct that image 28R2 has a surplus region in relation to region 38 of image 28L1.

Thus, these "findings", actually constitute suggestions for corrections. Thus, regions 38 and 40 may include an optimization applying parameters, such as minimal hair removing, or minimal area of treating, selected by the user.

FIG. 6 depicts the fourth step of the eyebrow shaping.

At the fourth step, image processor flips image 28R2 horizontally back, while yet presenting the differences/suggestions 38 and 40.

Referring again to FIG. 2, at the fourth step, image processor 62 of FIG. 1A, presents a screen 34B, containing images 28R1, 28R1, suggestions for corrections 38 and 40, within the entire face.

FIG. 7 depicts the fifth step of the eyebrow shaping.

At the fifth step, the user approves the suggestion, being in the example of changing image 28L1 to 28L2, and obtains equal horizontally mirrored images 28R1 and 28L2.

Figure 8:
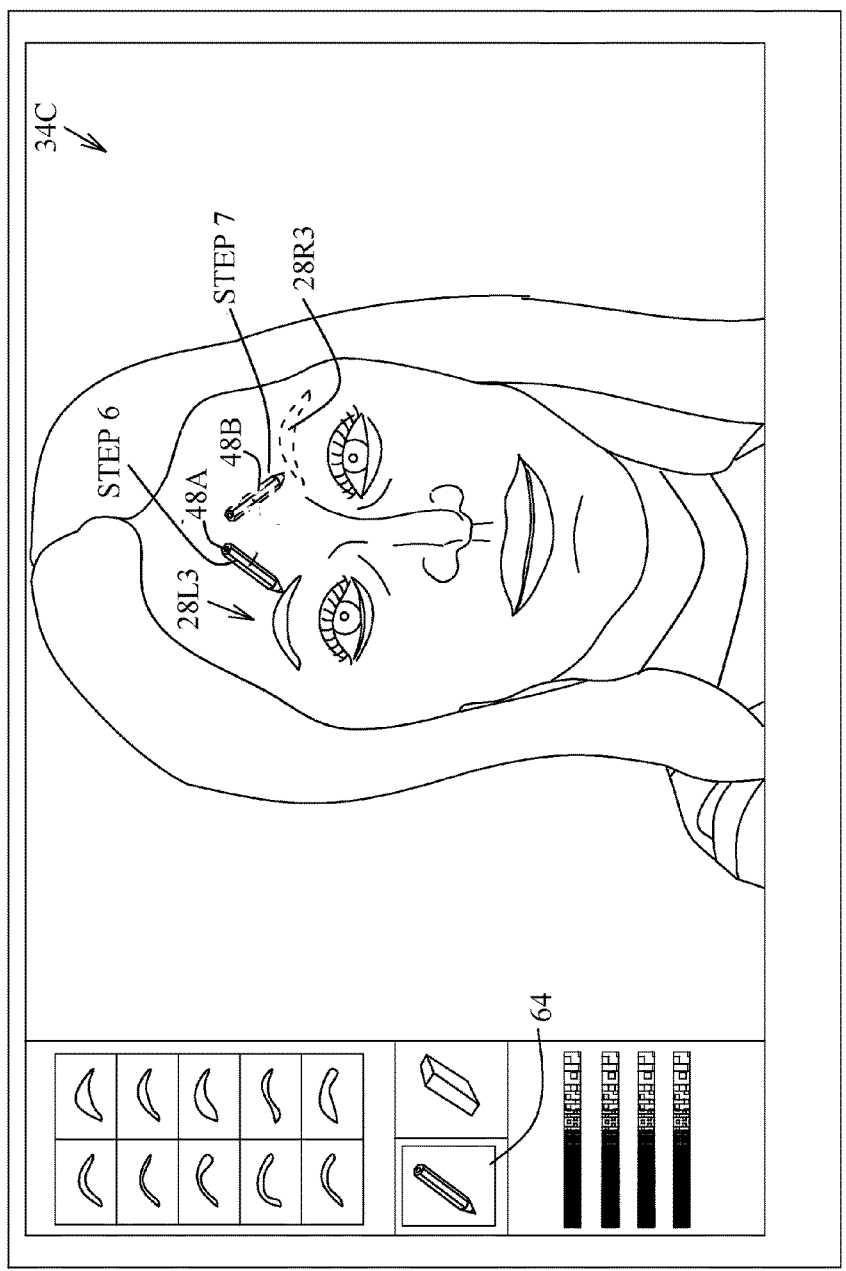
FIG. 8 depicts the sixth and seventh steps.

FIG. 8 depicts the sixth and seventh steps.

At the sixth step, the user may modify 34B of FIG. 2, including for adding, such as by an electronic brush 48A, amongst various painting tools 64, and for erasing.

According to a preferred embodiment, of this sixth step, the user may modify only one of the images, according to the example, only of the left eyebrow, thus may modify image 28L2 of FIG. 7 to 28L3 of FIG. 8.

At the seventh step, which occurs concurrently with the sixth step, image processor 62 of FIG. 1A copies image 28L3 of the left eyebrow, through horizontal flipping, as shown by a brush 48B, thus producing an image 28R3 of the right eyebrow.

Brushes 48A and 48B produce together a screen 34C.

FIG. 9 depicts the eighth step.

At the eight step, an CNC (Computer Numerical Control) 66 (shown in FIG. 1A) produces a program 54 including ordered physical steps 56A, 56B, etc., each including at least one of start and end locations 52, for painting by painting tip 24 of FIG. 1B, and for hair removal by hair removing tip 20 of FIG. 1B, for modifying the eyebrows of the user from the initial state of screen 34A to the approved state of screen 34C.

FIG. 10 depicts the ninth step.

At the ninth step, painting tip 24, hair removing tip 20, and robotic arm 16 execute program 54.

Thus, in one aspect, the invention is directed to an eyebrow shaping apparatus (10), including:

a camera (22), for capturing one image (28R1, 28L1) of each of two eyebrows (70) of a user (12) at an initial state (34A);

an image processor (62), for horizontally flipping one (28R1) of the two images (28R1, 28L1), and for searching for differences between the horizontally flipped image (28R2) and the other image (28L2), and for suggesting corrections (38, 40) in at least one (28R1) of the captured images (28R1, 28L1) for obtaining a requested state (34C) having two equal mirrored images (28R1, 28L2);

CNC (Computer Numerical Control) (66), for producing a program (54) including physical steps for modifying the eyebrows (70) from the initial state (34A) to the requested state (34C); and a painting tip (24), a hair removing tip (20), and a robotic arm (16), for executing the program (54).

The eyebrow shaping apparatus (10) may further include:

computerized modifying tools (48A), for manually modifying one of the equal mirrored images (28R1, 28L2), wherein the image processor (62) is further configured to copy (48B) the modified image (28L3), through horizontal flipping, thereby maintaining the equality of the mirrored images (28R1, 28L2).

An eyebrow shaping apparatus (10) according to claim 1, further including:

an optimizer (68), for optimizing the suggested corrections (38, 40) in the at least one (28R1) of the captured images (28R1, 28L1), wherein the optimization is based on at least one selected preference.

The at least one preference may be: minimal hair removing, minimal area of treating, minimal color changing.

In the figures and/or description herein, the following reference numerals (Reference Signs List) have been mentioned:

numeral 10 denotes the eyebrow shaping apparatus according to one embodiment of the invention;

numeral 14 denotes a holding accessory, for holding the user's head;

numeral 16 denotes the robotic arm;

numeral 18 denotes a step motor of the robotic arm;

numeral 24 denotes a painting tip;

numeral 26 denotes paints bin, from which the painting tip consumes paint;

numerals 28R1, 28R2 and 28R3 denote images of the right eyebrow;

numerals 28L1, 28L2 and 28L3 denote images of the left eyebrow;

numeral 30 denotes a display for showing various screens;

numerals 34A, 34B and 34C denote the initial state of the eyebrow, the next state, and the request state thereof, respectively;

numeral 38 denotes an absent region found in one eyebrow in relation to the other;

numeral 40 denotes a surplus region found in one eyebrow in relation to the other;

numeral 42 denotes shapes of eyebrows;

numeral 46 denotes a color for selecting for painting;

numeral 48A denotes an electronic brush, for manually electronically painting the image;

numeral 48B denotes an electronic brush, for electronically copying, through mirror, the image, as calculated from the location of electronic brush 48A;

numeral 52 denotes a physical starting location or a physical ending location of the hair removing tip or of the painting tip at a physical step thereof;

numeral 54 denotes a program including ordered physical steps for the hair removing tip and for the painting tip;

numerals 56A and 56B denote physical steps of the hair removing tip or of the painting tip;

numeral 62 denotes the image processor;

numeral 64 denotes a painting tool for being selected;

numeral 66 denotes CNC (Computer Numerical Control), for computing ordered physical steps for correcting the eyebrows;

numeral 68 denotes an optimizer, being software for optimizing between several available corrections, for suggesting the most optimal one; and numeral 70 denotes a physical eyebrow of the user, being shaped by the eyebrow shaping apparatus.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. An eyebrow shaping method, comprising the steps of:

capturing two images, each of one of two eyebrows of a user at an initial state;

horizontally flipping one of said two images;

searching for differences between the horizontally flipped image and the other image;

suggesting corrections in at least one of said captured images for obtaining a requested state comprising two equal mirrored images;

operating at least one of a painting tip and a hair removing tip, for modifying said eyebrows from said initial state to said requested state according to said suggested corrections;

manually modifying one of said equal mirrored images; and copying the modified image, through horizontal flipping, thereby maintaining said equality of said mirrored images.

2. An eyebrow shaping method comprising the steps of:

capturing two images, each of one of two eyebrows of a user at an initial state;

horizontally flipping one of said two images;

searching for differences between the horizontally flipped image and the other image suggesting corrections in at least one of said captured images for obtaining a requested state comprising two equal mirrored images;

operating at least one of a painting tip and a hair removing tip, for modifying said eyebrows from said initial state to said requested state according to said suggested corrections; and optimizing said suggested corrections in said at least one of said captured images, wherein the optimization is based on at least one selected preference.

3. An eyebrow shaping method according to claim 2, wherein said at least one preference comprises at least one member selected from a group consisting of: minimal hair removing, minimal area of treating.

* * * * *